United States Patent [19]

Sipsma

[11] Patent Number: 4,792,317

[45] Date of Patent: Dec. 20, 1988

[54] METHOD FOR MAKING A MAGNETIC SHIELD

[75] Inventor: John L. Sipsma, Wyoming, Mich.

[73] Assignee: Center Manufacturing Inc., Byron Center, Mich.

[21] Appl. No.: 879,948

[22] Filed: Jun. 30, 1986

[51] Int. Cl.[4] ........................ H01J 29/06; B23P 23/00

[52] U.S. Cl. .................................. 445/23; 228/173.6; 313/402; 313/479; 219/82

[58] Field of Search .................. 313/402, 479; 445/23; 228/173.6; 219/82, 83

[56] References Cited

U.S. PATENT DOCUMENTS

| | | | |
|---|---|---|---|
| 3,418,707 | 12/1968 | Emerson | 228/173.6 X |
| 3,516,147 | 6/1970 | Seedorft et al. | 228/173.6 |
| 3,715,558 | 2/1973 | McGill | 219/82 |
| 3,748,721 | 7/1973 | Alexander | 219/83 X |
| 3,792,522 | 2/1974 | Gray et al. | 228/173.6 X |
| 4,580,076 | 4/1986 | Shimoma et al. | 313/402 |

*Primary Examiner*—Kenneth J. Ramsey
*Attorney, Agent, or Firm*—Price, Heneveld, Cooper, DeWitt & Litton

[57] ABSTRACT

The specification discloses a method for forming thin metal, television tube magnetic shields by blanking "lazy C" shaped blanks from a strip of thin metal, forming the blanks around a truncated pyramidal form so their edges overlap, mash seam welding the overlapping edges so as to eliminate open space between the overlapping portions and forming a peripheral flange by bending the outer edge of the thus formed truncated pyramidal member.

9 Claims, 5 Drawing Sheets

METHOD FOR MAKING A MAGNETIC SHIELD

BACKGROUND OF THE INVENTION

The present invention relates to magnetic shields for use in or about television picture tubes, or like configured, light gauge parts. In order to be operable, a picture tube must include a low to no carbon magnetic shield positioned adjacent the outwardly and forwardly sloping picture tube walls. Such magnetic shields prevent external magnetism from distorting the television picture.

These shields are made of a very thin low to no carbon steel. The material is approximately 0.004 inch thick. Such shields are usually formed by blanking, drawing and then trimming a very thin piece of steel.

Unfortunately, it is difficult to form such thin steel without creating wrinkles. Also, more expensive drawable steel is required. This method also restricts design of the shield and of the resulting picture tube in that a draw flange must be provided on the shield.

FIG. 1 shows a prior art magnetic shield with, as is typical, numerous wrinkles and creases. Such shields have usually been placed inside the tube because of their poor appearance, even though such interior placement is not functionally necessary. The wrinkles and creases hold dirt, moisture and fluid used to degrease the part after forming. If such dirt, moisture or fluid gets inside the picture tube, it will cause discrepancies in the quality of the picture. Foreign matter can also short the guns.

Elaborate steps are sometimes taken to try to shake dirt and fluid out of such magnetic shields. They are typically cleaned and then placed on a shaker table to shake dirt and fluid out of the wrinkles and creases.

In spite of precautions, dirt in the magnetic shield is still one of the causes of tube failure. Manufacturers of picture tubes have had a long felt need for wrinkle-free magnetic shields which would substantially eliminate the foregoing contamination and cosmetic problems.

SUMMARY OF THE INVENTION

This long felt need is filled by the present invention in which instead of blanking and forming the magnetic shield in a single piece, two separate halves are blanked flat, then formed over a form block with lapping edges are welded so as to substantially eliminate any open space between the lapping edges. Such welding eliminates any gaps along the weld line which could trap dirt.

As a result of this forming method, a magnetic shield is formed which has smooth surfaces, substantially free of wrinkles and creases and substantially free of any gaps in which dirt could be hidden. These and other objects, advantages and features of the present invention will be more fully understood and appreciated by reference to the written specification and appended drawings.

DESCRIPTION OF THE PREFERRED EMBODIMENT

Figure 2:
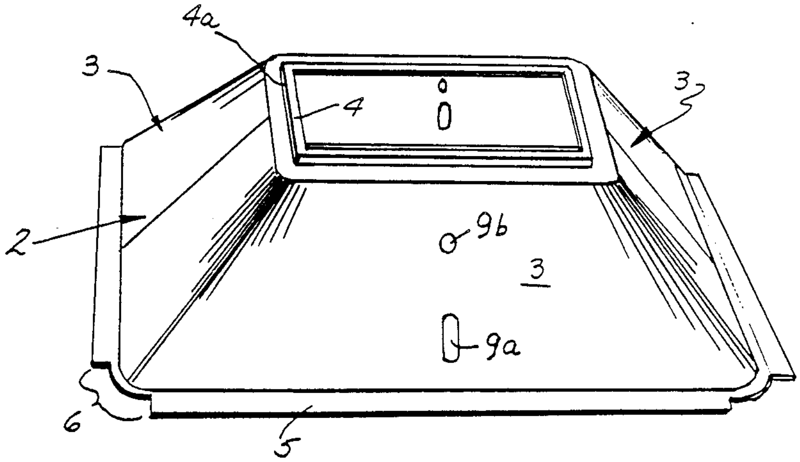
FIG. 2 is a perspective view of a magnetic shield made in accordance with the present invention.

The magnetic shield 2 of the present invention comprises a plurality of generally flat sidewalls 3 which terminate at the top in an upper inwardly projecting flange 4 and at the bottom and an outwardly turned mounting flange 5 (FIG. 2). Bottom flange 5 is cut away at its corners 6. The upper flange 4 is formed into a slightly raised shoulder **4*a* which goes all the way around upper flange 4**.

Figure 1:
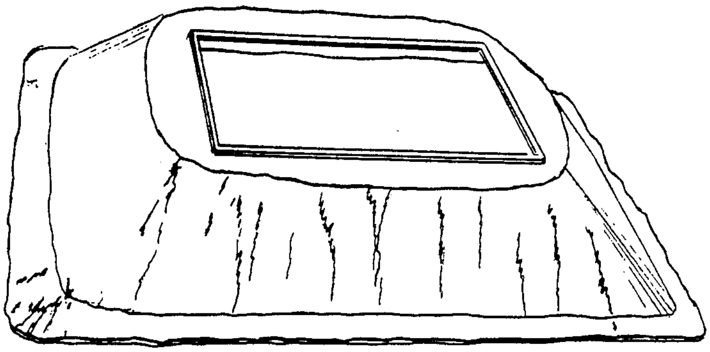
PRIOR ART Fig. 1.
FIG. 1 is a perspective view of a prior art magnetic shield.

It is important to the present invention that the sides 3 be generally flat and that the corners 6 of lower flange 5 be cut away. These features facilitate formation of the product in accordance with the present invention. While some curvature in sidewalls 3 may be acceptable, it must not be sufficiently great as to cause sidewalls 3 to be drawn to the extent of creating wrinkles or creases therein as happens in the prior art magnetic shield 1 (FIG. 1).

Figure 3:
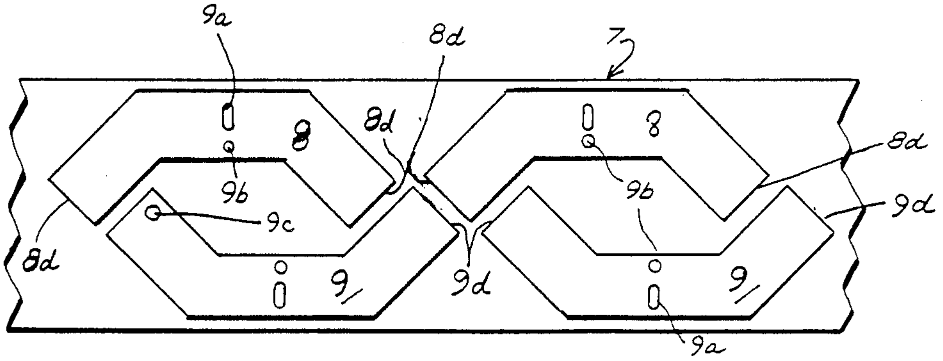
FIG. 3 is a plan view of a strip of steel showing the manner in which opposite halves of the shield of the present invention are blanked.

In the preferred embodiment, "lazy C" shaped blanks 8 and 9 are stamped flat out of a roll of steel 7 (FIG. 3). Appropriate slots **9*a*, holes 9*b* and larger holes 9*c* can be cut into blank 9 and blank 8**, as required by the television tube design.

Figure 4:
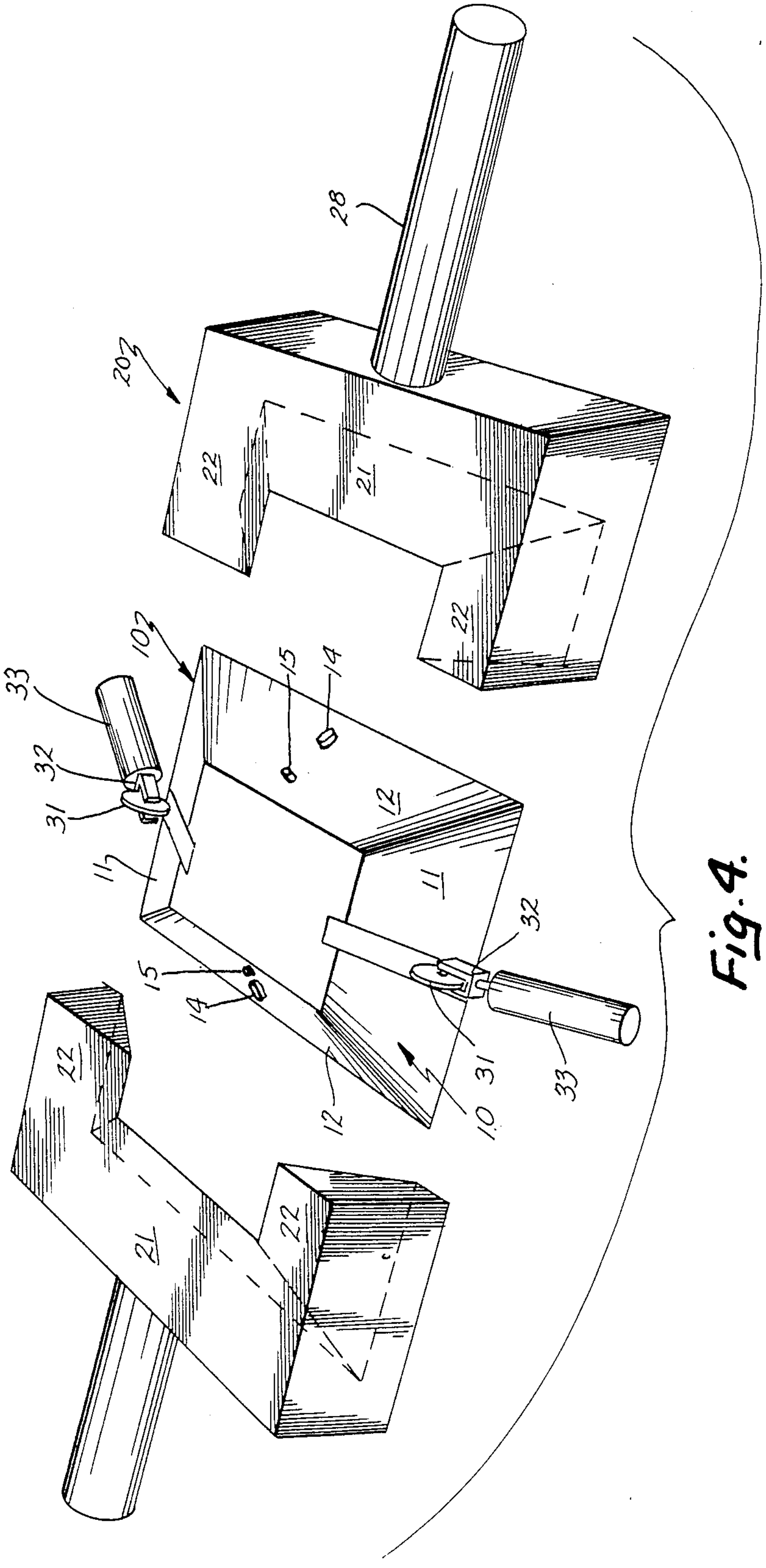
FIG. 4 is a perspective view illustrating the initial forming and mash seam welding apparatus.

Blanks 8 and 9 are then folded over form block 10 so that their edges **8*d* and 9*d* respectively overlap along a pair of longitudinal weld bars or weld contacts 13 embedded in the sloping sides 11 of form block 10 (FIG. 4). Sloping sides 11 are joined by sloping end walls 12, thereby giving the desired frustro pyramidal shape to blanks 8 and 9 as they are formed over sides 11 and ends 12**.

The actual shaping or bending of blanks 8 and 9 around end walls 12 and onto sidewalls 11 of form 10 is accomplished by means of forming clamps 20 on either side of form block 10. Forming clamps 20 are generally U-shaped and have an interior frustro pyramidal shape defined by a base 21 and a pair of sides 22. The inside dimensions of each clamp 20 mate with the exterior dimensions of forming block 10, leaving just sufficient clearance for the thickness of metal blanks 8 and 9.

End walls 12 of forming block 10 may include a slot locater projection 14 and a hole locater projection 15. These mate with slots **9*a* and holes 9*b* in blanks 8 and 9 and help hold blanks 8 and 9 in position on forming block 10 as clamps 20 fold blanks 8 and 9 around the ends 12 of forming block 10. Each clamp 20 includes a slot locater clearance hole 23 and a hole locater clearance aperture 24 (FIG. 5**).

Figure 5:
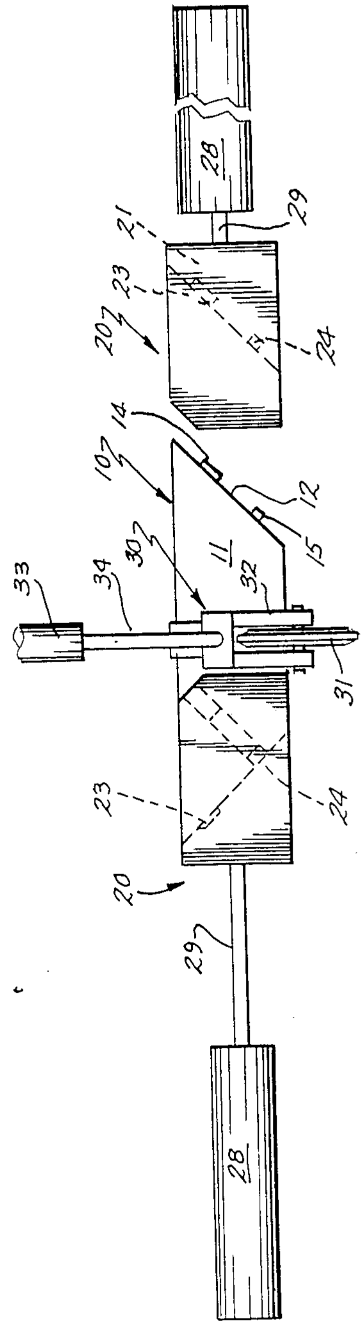
FIG. 5 is an elevational view of that apparatus.

Clamps 20 are driven towards forming block 10 by means of clamp cylinders 28 and their respective pistons 29 (FIG. 5). Preferably, one clamp 20 engages a blank 8 or 9 first, and the second clamp 20 then engages its respective blank and clamps it into position. This way, proper lapping of the edges **8*d* and 9*d*** is insured.

Figure 6:
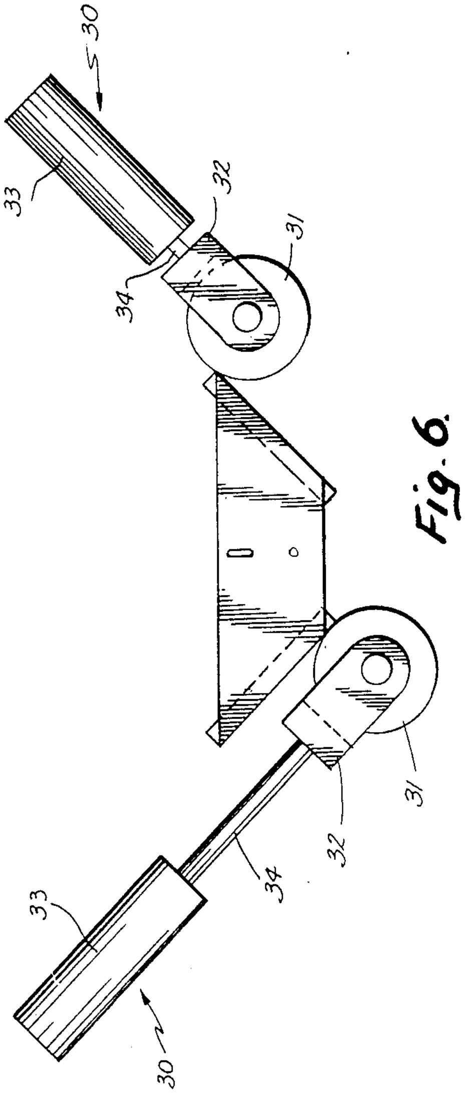
FIG. 6 is an elevational view of that apparatus rotated 90 degrees from FIG. 5, with the clamps not shown.

Once blanks 8 and 9 are formed around form block 10, a pair of oppositely disposed seam welders 30 weld the overlapping edges 8*d* and 9*d*. Each seam welder 30 includes a welding wheel 31 and a supporting wheel block 32 as is conventional. Block 32 is carried on the piston 34 of a cylinder 33 (FIGS. 5 and 6). By comparing the left and right welders 30 of FIG. 6, one can see the manner in which the welders roll over the surfaces to be welded. It is important that the weld be accomplished in such a way that no gaps or spaces are left between the overlapping metal portions. Thus it is important that the weld line be at the edges of the lapped sides so that no raised edge is left to the outside of the weld. The possibility of dirt or the like collecting in the seam is thereby eliminated. Other welding techniques could be used provided they accomplish the same goal of eliminating gaps or spaces.

Thus formed, the part takes on a (frustro) truncated pyramidal shape. The part has the general appearance as in FIG. 2, but as yet no outer flange 5 and no inner flange 4 have been formed.

Figure 7:
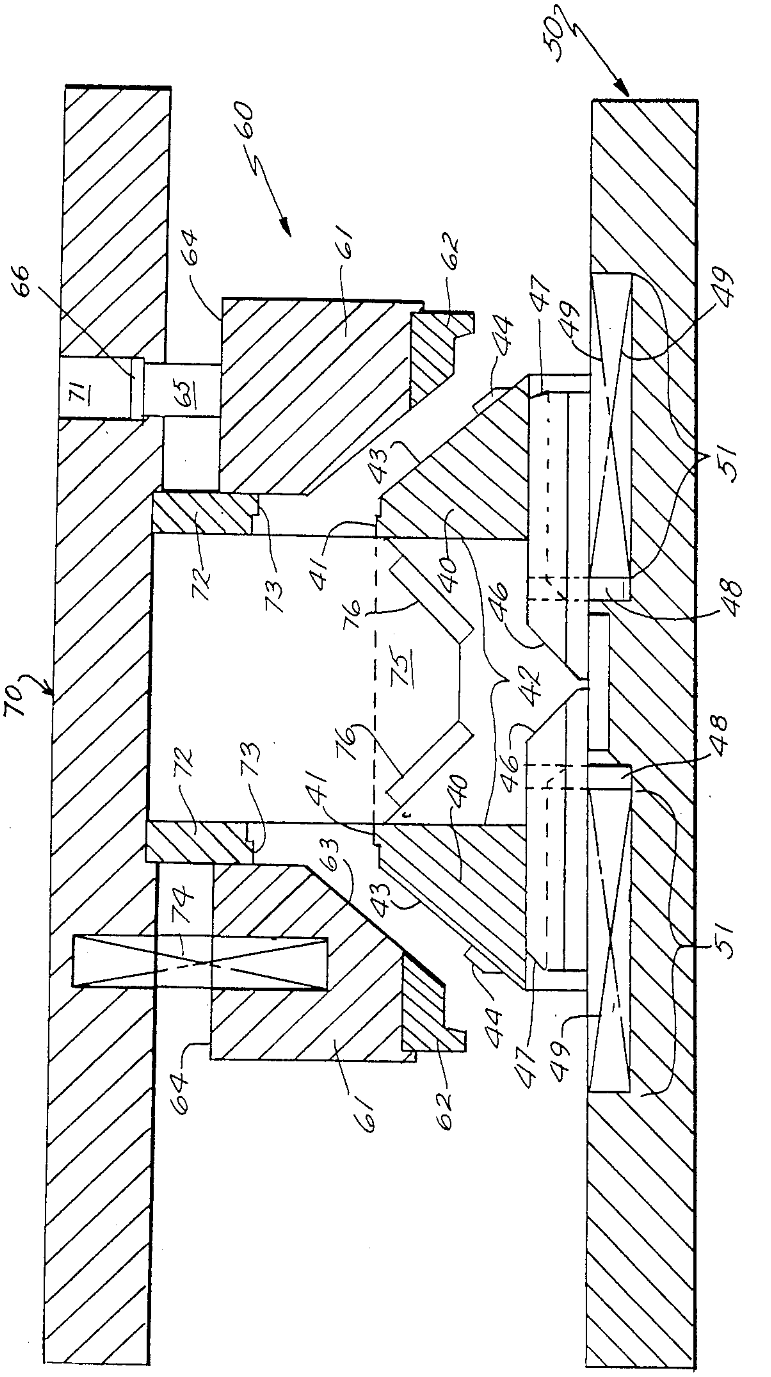
FIG. 7 is a cross sectional view of a final forming die assembly in its opened condition.
Figure 8:
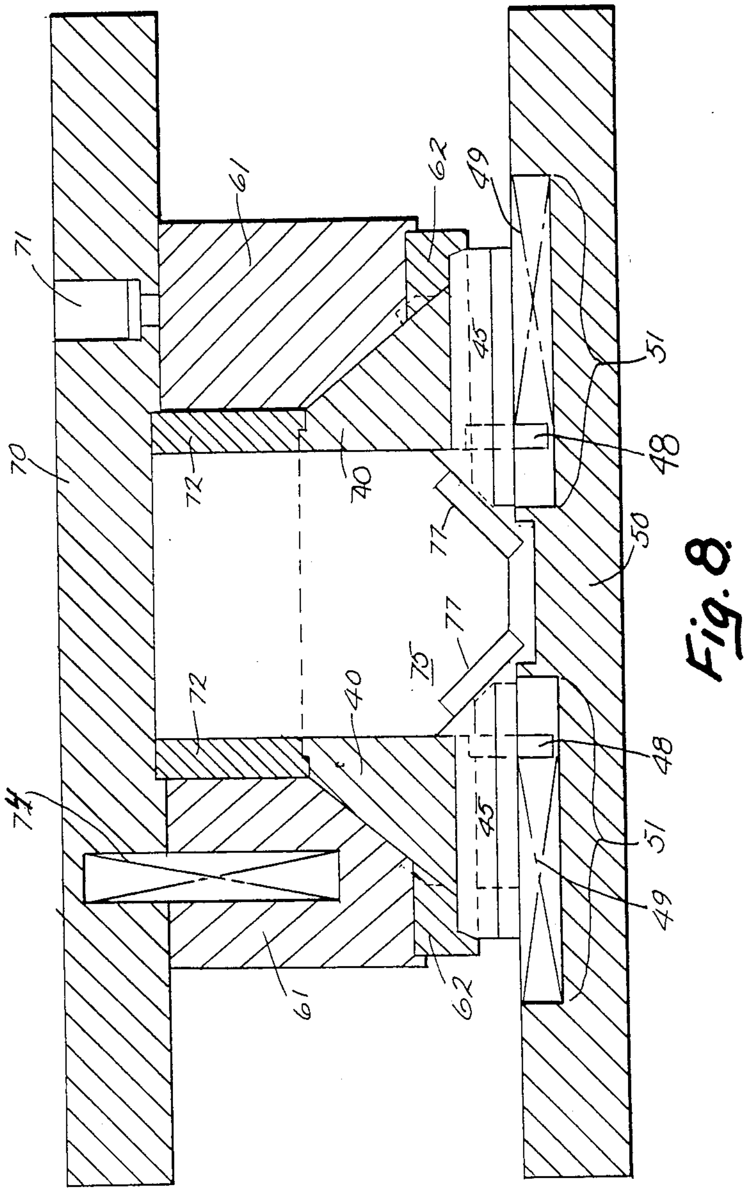
FIG. 8 is the same cross sectional view of the same apparatus in its closed condition.

In order to shape outer flange 5 and inner flange 4, cam form die 40 and upper forming assembly 60 are required (FIGS. 7 and 8). Cam form die 40 comprises a central opening 42 surrounded at its upper perimeter by a shoulder forming projection 41. Four sloped sidewalls 4 slope downwardly from the top of cam forming die 40. The partially formed shield 2 is lowered over cam form die 40 until its slots 9*a* seat over slot locater projections 44 on sloped sidewalls 43. Located at the bottom of form die block 40 are four cam slides 45, arrayed around the open center 42 and projecting outwardly towards each of the four sides 43. Each slide 45 includes an inner wedge surface 46 and an outer sloped shoulder 47. A spring back stop member 48 is mounted within each slide 45 and projects downwardly into a groove 51 in the form die base 50. Also mounted within grooves 50 are spring means 49 which bias cam slides 45 inwardly towards the open center 42 of cam form die 40.

While provision for a mounting flange has been described, the magnetic shield of the present invention could be made without such a flange. Picture tube producers are accustomed to such flanges since it is not practical to draw a shield without including a flange. In the present invention, such a flange can easily be eliminated, and in fact make this process more economical.

Once the partially formed magnetic shield 2 is positioned on cam form die 40, it is ready for final shaping by the upper forming assembly 60. Upper forming assembly 60 comprises an upper clamping ring 61 which is open in the center and extends around the upwardly projecting cam forming die 40. Clamping ring 61 includes a lower shoulder forming lip 62 and downwardly and outwardly sloped sides 63 which come down on top of the sidewalls 3 of part 2 and clamp them against sloping walls 43 of form die 40. (Compare FIGS. 7 and 8).

Projecting upwardly from the top 64 of clamping ring 61 are a plurality of guide rods 65. Each guide rod 65 includes an upper shoulder 66. Guide rods 65, including their shoulder 66 are carried in guide rod slide ways 71 in a top plate 70 slidably mounted above clamping ring 61 for vertically slidable movement with respect thereto. Top plate 70 and clamping ring 61 are normally separated by a plurality of spring means 74 carried at one end within ring 61 and at the other end with end top plate 70. Once clamping ring 61 has clamped against the part on lower cam form die 40, the press begins to force top plate 70 downwardly.

Projecting downwardly from top plate 70 is a center cam 75 which includes a peripheral shoulder forming member 72 extending peripherally around the upper portion thereof. Shoulder forming member 72 includes a bottom projecting lip 73 which mates with shoulder 41 on cam form die 40 to thereby form the configured shoulder 4*a* on the inner flange 4 of magnetic shield 2.

Center cam 75 projects downwardly beyond shoulder forming ring 72 and includes inwardly and downwardly sloped lower sides 76 having hardened steel cam members 77 embedded therein. As center cam 75 is pushed downwardly by the press, cam surface members 77 engage wedge surfaces 46 on slides 45, and thereby force slides 45 outwardly (compare FIGS. 7 and 8). This catches the lower portion of the partially formed magnetic shield 2 and forces it outwardly to define outer flange 5. Sloped shoulder 47 on each cam slide 45 causes the outermost edge of outer flange 5 to roll over and further strengthen and stiffen magnetic shield 2. When upper forming assembly 60 is retracted upwardly again, magnetic shield 2 is completely formed and can be removed from lower cam form die 40.

The resulting part is cosmetically smooth and generally free of wrinkles and creases. It can be readily degreased and dried without substantial fear of cleaning fluid and/or dirt and/or water gathering in any hidden places. As a result, the failure and scrap rate of television tubes can be greatly reduced by using the magnetic shield formed in accordance with the present invention. Also flexibility of shield and tube design is increased.

Of course, it is understood that the above is merely a preferred embodiment of the invention and that various changes and alterations can be made without departing from the spirit and broader aspects thereof as set forth in the appended claims.

The embodiments of the invention in which an exclusive property or privilege is claimed are defined as follows:

1. A method for forming a television tube magnetic shield or like thin metal parts having a truncated pyramidal configuration comprising:

blanking a pair of "lazy C" shaped blanks from a strip of relatively thin metal;

forming said blanks around a truncated pyramidal form so that their ends edges overlap, said form having smooth, rounded corners and generally flat sides in a vertical direction; forming a peripheral flange on said thus formed truncated pyramidal member by bending the outer edge of said truncated pyramidal member outwardly; welding the overlapping edges of said blanks so as to substantially eliminate any open space between said overlapping portions.

2. The method of claim 1 which includes forming said blanks with a small cut out relief at each outside corner of said "lazy C" configuration whereby corner wrinkling is avoided when said outer peripheral flange is formed.

3. The method of claim 2 which includes forming an upper inside flange on said truncated pyramidal member.

4. The method of claim 3 which includes forming a shoulder in said upper inside flange.

5. The method of claim 4 in which said step of bending an outside flange in said truncated pyramidal member is performed by placing said truncated pyramidal member over a truncated pyramidal form with the extreme exterior portions of the sides overhanging said form, and then sliding bending cams outwardly from beneath said form to force said extreme portions of said sides of said truncated pyramidal member outwardly.

6. The method of claim 5 in which said upper inside flange is formed by leaving the upper extreme portions of said sides of said truncated pyramidal member overhanging said truncated pyramidal form and bending them inwardly by bringing an upper die downwardly against the upper portion of said truncated pyramidal form.

7. A method for forming a television tube magnetic shield or like thin metal parts having a truncated pyramidal configuration comprising:

blanking a pair of "lazy C" shaped blanks from a strip of relatively thin metal;

forming said blanks around a truncated pyramidal form so that their end edges overlap in a generally continuous manner from the top edge to the bottom edge of said blanks, said form having smooth, rounded corners and generally flat sides in a vertical direction; and seam welding the overlapping edges of said blanks so that the weld line is positioned at and along the edges of the overlapped sides so that no raised edge is left to the outside of the weld, to substantially eliminate any open space between said overlapping portions, whereby the risk of collecting dirt or the like in the overlapped edges is substantially obviated.

8. For use in a television tube, a truncated pyramidal magnetic shield of thin, low carbon metal comprising:

two generally C-shaped metal halves, each defining one-half of a truncated pyramidal configuration, having overlapping edge portions continuously welded together at least at and along the seam edges to minimize the possibility of any gaps or spaces between said overlapping edge portions; and each of said sides of said truncated pyramidal member being generally flat and planar in configuration and joining each other at smooth, rounded corners.

9. The product of claim 8 which includes a peripheral flange on the outside edge of said truncated pyramidal member formed by bending the outer edges of said truncated pyramidal member outwardly, said truncated pyramidal member including a small cutout relief at each outside corner whereby corner wrinkling is avoided when said outer peripheral flange is formed.

* * * * *